W. GRIKSCHEIT.
COCK.
APPLICATION FILED JAN. 25, 1919.
1,332,894.
Patented Mar. 9, 1920.
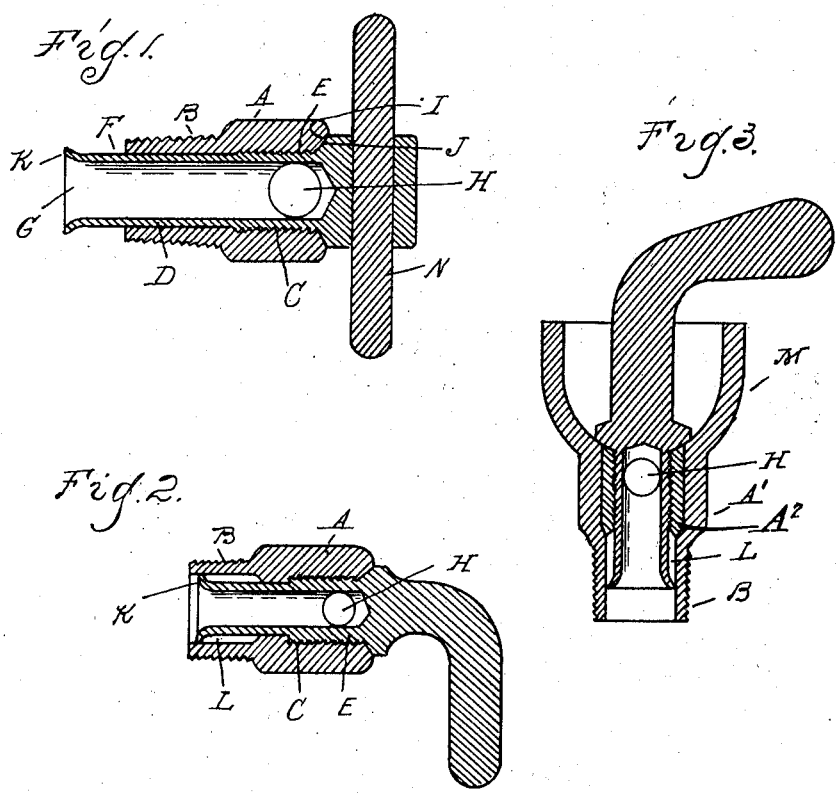
Inventor
William Grikscheit
By Whittemore Hulbert & Whittemore
Attorneys

UNITED STATES PATENT OFFICE.

WILLIAM GRIKSCHEIT, OF DETROIT, MICHIGAN.

COCK.

1,332,894.   Specification of Letters Patent.   Patented Mar. 9, 1920.

Application filed January 25, 1919. Serial No. 273,072.

*To all whom it may concern:*

Be it known that I, WILLIAM GRIKSCHEIT, a citizen of the United States of America, residing at Detroit, in the county of Wayne and State of Michigan, have invented certain new and useful Improvements in Cocks, of which the following is a specification, reference being had therein to the accompanying drawings.

The invention relates to cocks of the type used for drain cocks, priming cups, and similar purposes, and the invention consists in the construction as hereinafter set forth.

In the drawings:

Figure 1 is a longitudinal section through a drain cock;

Fig. 2 is a similar view showing a modified construction;

Fig. 3 is a similar view showing a priming cup.

A is a casing member having a threaded nipple portion B for attachment to the engine or other structure. This casing has a bore extending completely therethrough, and at the outer end is the internally threaded portion C. D is a stem having a portion E threaded to engage the threads C and a portion F extending inward from the threaded portion. The stem is bored from its inner end, as indicated at G, and there is also a transverse bore H in the threaded portion E. Beyond this transverse bore the stem has a shoulder I, preferably beveled and engaging a correspondingly beveled seat J on the member A. The inner end of the stem has a turned flange K which acts as a stop to limit the outward movement of the stem and to prevent disengagement of the same from the member A. There is, however, sufficient clearance provided to permit of clearing the casing A by the portion of the stem having the transverse bore H therein.

As shown in Fig. 1, the flange K and inner part of the portion F of the stem extends inward beyond the inner end of the member A and when the stem is moved outwardly, the flange K is stopped by contacting with the inner end of said member A. In Fig. 2 the member A is counterbored, as indicated at L, providing clearance for the flange K. The stem is stopped when said flange reaches the inner end of the counterbore. In Fig. 3 the casing is comprised by a member A' which may be pressed or drawn into shape from a sheet metal blank and which is formed with a flaring outward extension M, forming a cup, and a bushing $A^2$ inserted in the member A' just below said cup and internally threaded for engagement with the stem. The stem is provided with a handle, either by bending its outer end to extend laterally, as shown in Figs. 2 and 3, or by a cross pin N, shown in Fig. 1.

In all the disclosed forms of the invention, when the stem D is in its inner limiting position, the shoulders I and J may engage each other with sufficient firmness to prevent leakage. Upon outward adjustment of the stem, a flow is permitted to the extent that the bore H is displaced from the interior of the casing A.

The construction is exceedingly simple and inexpensive to manufacture and has the advantage that there are no detachable parts to become lost.

What I claim as my invention is:—

1. A cock, comprising a casing member having a bore extending therethrough between the inner and outer ends of the casing, threaded at its outer end, a stem having a correspondingly threaded portion for engaging the threads of said casing, said stem having a longitudinal bore extending from its inner end partly therethrough, a transverse bore connecting with the outer end of said longitudinal bore, and a stop at the inner end of the stem for limiting the outward movement thereof.

2. A cock, comprising a casing having a longitudinal bore extending therethrough between the inner and outer ends of the casing, the outer end thereof being threaded, a stem having a threaded portion to engage the threads of said casing and an unthreaded portion extending inwardly therefrom, said stem being hollow for a portion of its length and open at its inner end with a transverse bore connecting with the outer end of the hollow portion, a shoulder on said stem outside of said transverse bore for engaging a seat on said casing, and a stop on the inner end of said stem for limiting the outward movement thereof.

3. A cock, comprising a casing having a bore extending therethrough between the inner and outer ends of the casing, threaded at its outer end and counterbored at its inner end, a stem, hollow for a portion of its length, having a threaded portion for engaging the threaded portion of said casing and at its inner end having a flange within said counterbore, said stem also having a shoulder outside of the threads for engaging a seat on said casing and being provided with a transverse bore inside of said shoulder communicating with the hollow portion.

4. A cock, comprising a casing externally threaded at its inner end for engagement with the member to which it is attached and terminating in a cup at its outer end, and provided with a longitudinal tubular opening from said cup to the inner end, which is internally threaded adjacent to the cup and is of an increased diameter in its inner portion, a stem having a hollow portion threaded for a portion of its length to engage the threads in said casing and having an inwardly extending portion terminating in a flange within the inner portion of said opening, said stem also having a collar thereon for engaging a seat at the base of said cup portion and being transversely bored inside of said collar.

5. A cock, comprising a casing formed by a tubular pressed sheet metal member and an interiorly threaded bushing inserted in said member, and a stem engaging in said casing having a portion threaded for engagement with said bushing, said stem being hollow for a portion of its length and open at its inner end and having a transverse bore opening into the outer end of its hollow portion, said bushing and stem respectively having shoulders engageable to limit outward adjustment of the stem.

In testimony whereof I affix my signature.

WILLIAM GRIKSCHEIT.